(12) United States Patent
Yamamoto et al.

(10) Patent No.: US 11,394,050 B2
(45) Date of Patent: Jul. 19, 2022

(54) NONAQUEOUS ELECTROLYTE BATTERY AND BATTERY PACK

(71) Applicants: KABUSHIKI KAISHA TOSHIBA, Minato-ku (JP); Toshiba Infrastructure Systems & Solutions Corporation, Kawasaki (JP)

(72) Inventors: Dai Yamamoto, Kashiwazaki (JP); Keigo Hoshina, Kashiwazaki (JP); Ryo Hara, Kashiwazaki (JP); Norio Takami, Yokohama (JP); Yasuhiro Harada, Isehara (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 446 days.

(21) Appl. No.: 16/257,103

(22) Filed: Jan. 25, 2019

(65) Prior Publication Data

US 2019/0173121 A1 Jun. 6, 2019

Related U.S. Application Data

(63) Continuation of application No. PCT/JP2016/072384, filed on Jul. 29, 2016.

(51) Int. Cl.
*H01M 4/131* (2010.01)
*H01M 4/485* (2010.01)
(Continued)

(52) U.S. Cl.
CPC .......... *H01M 10/056* (2013.01); *C01G 33/00* (2013.01); *H01M 4/131* (2013.01); *H01M 4/36* (2013.01);
(Continued)

(58) Field of Classification Search
CPC ...... H01M 4/364; H01M 4/131; H01M 4/485; H01M 10/0525; H01M 2220/20
See application file for complete search history.

(56) References Cited

U.S. PATENT DOCUMENTS

2016/0141615 A1 5/2016 Nakayama et al.
2017/0162872 A1 6/2017 Takami et al.

FOREIGN PATENT DOCUMENTS

| JP | 2002-190232 A | * | 7/2002 |
| JP | 2005-267940 A | * | 9/2005 |
| JP | 4237659 | | 3/2009 |
| JP | 2016-100077 | | 5/2016 |
| WO | WO 2015/019922 A1 | | 2/2015 |

(Continued)

OTHER PUBLICATIONS

International Search Report dated Sep. 20, 2016 in PCT/JP2016/072384 filed on Jul. 29, 2016 (with English Translation).

(Continued)

*Primary Examiner* — Niki Bakhtiari
(74) *Attorney, Agent, or Firm* — Oblon, McClelland, Maier & Neustadt, L.L.P.

(57) ABSTRACT

According to one embodiment, provided is a nonaqueous electrolyte battery including a positive electrode, a negative electrode, and a nonaqueous electrolyte. The negative electrode contains a negative electrode active material containing orthorhombic Na-containing niobium-titanium composite oxide particles represented by general formula (1) $Li_{2+v}Na_{2-y}M1_xTi_{6-y-z}Nb_yM2_zO_{14+\delta}$. In general formula (1), M1 is one or two or more elements selected from the group consisting of Cs, K, Sr, Ba, and Ca, M2 is one or two or more elements selected from the group consisting of Zr, Al, Sn, V, Ta, Mo, W, Fe, Co, and Mn, $0 \leq v < 2$, $0 \leq x < 2$, $0 < y < 2$, $0 \leq z < 3$, and $-0.5 \leq \delta \leq 0.5$. The nonaqueous electrolyte contains an Na component in a range of 10 ppm by mass to 3,000 ppm by mass.

7 Claims, 5 Drawing Sheets

(51) Int. Cl.
    *H01M 10/056*    (2010.01)
    *C01G 33/00*     (2006.01)
    *H01M 4/505*     (2010.01)
    *H01M 4/525*     (2010.01)
    *H01M 4/36*      (2006.01)
    *H01M 4/02*      (2006.01)

(52) U.S. Cl.
    CPC .......... *H01M 4/364* (2013.01); *H01M 4/366* (2013.01); *H01M 4/485* (2013.01); *H01M 4/505* (2013.01); *H01M 4/525* (2013.01); *C01P 2002/70* (2013.01); *C01P 2004/60* (2013.01); *H01M 2004/027* (2013.01); *H01M 2004/028* (2013.01); *H01M 2220/20* (2013.01)

(56) References Cited

FOREIGN PATENT DOCUMENTS

WO    WO 2016/084200 A1    6/2016
WO    WO 2016/088193 A1    6/2016

OTHER PUBLICATIONS

Written Opinion dated Sep. 20, 2016 in PCT/JP2016/072384 filed on Jul. 29, 2016.

Muto, F., et al., "Hydrothermal Synthesis of Sodium Lithium Titanates and Their Crystal Structures", Journal of the Chemical Society of Japan, 1977, No. 4, pp. 492 to 499 (with English Abstract).

* cited by examiner

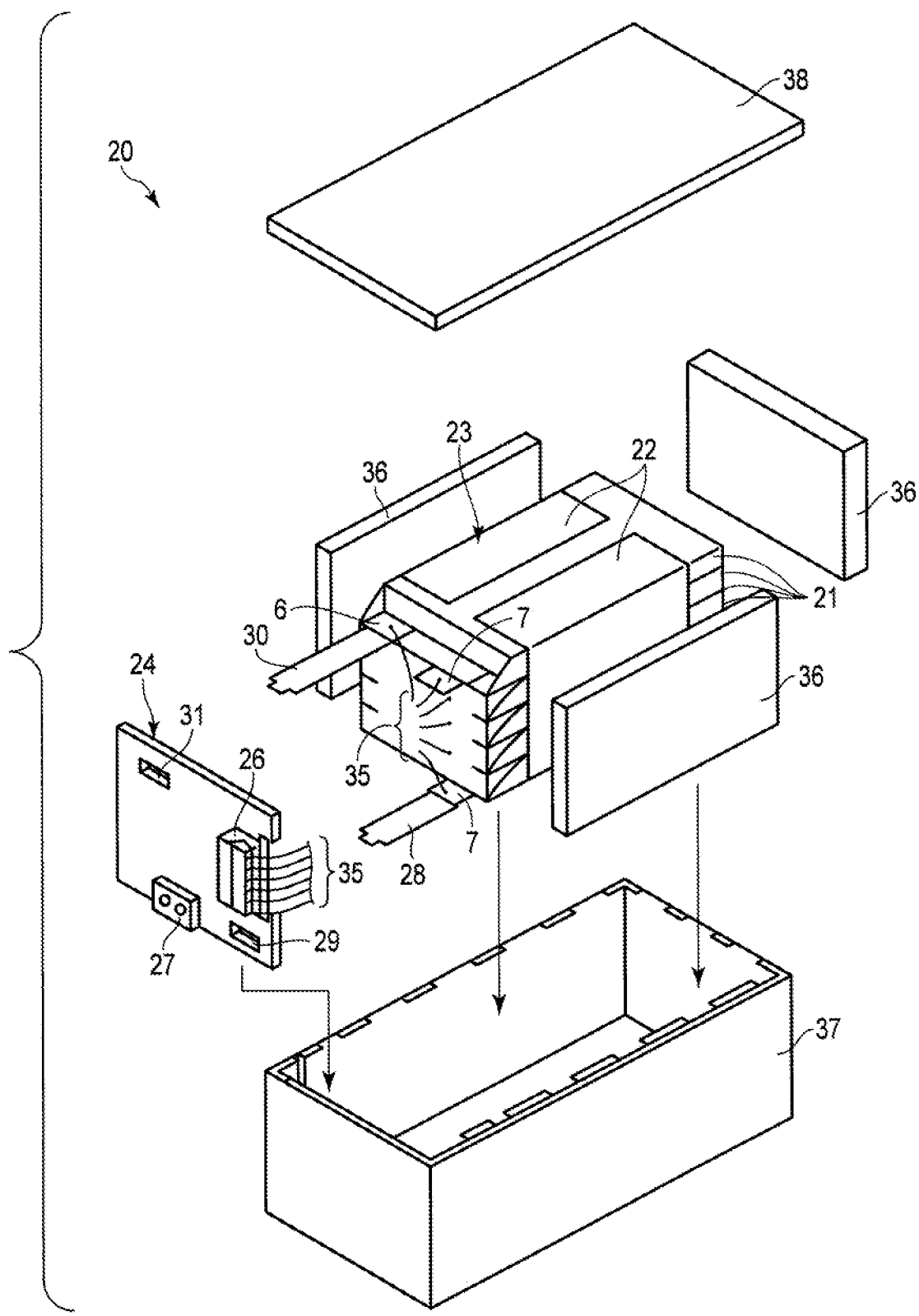
F I G. 5

NONAQUEOUS ELECTROLYTE BATTERY AND BATTERY PACK

FIELD

Embodiments of the present invention described herein relate generally to a nonaqueous electrolyte battery and a battery pack.

BACKGROUND

Among nonaqueous electrolyte batteries, extensive studies have been made as a high-energy density battery, for those performing charge and discharge by movement of lithium ions between the negative and positive electrodes.

Nonaqueous electrolyte batteries are anticipated to be used as a medium-sized or large-sized power supply for onboard and stationary applications and the like, in addition to the use as a power supply for compact electronic devices. Excellent life performance and high security are desired in the application field of medium-sized and large-sized power supplies. In addition, high input/output performance may be demanded in some cases.

A nonaqueous electrolyte battery using spinel lithium titanate for the negative electrode is known as a nonaqueous electrolyte battery having excellent life performance and high safety. However, since the lithium insertion/extraction potential of spinel lithium titanate is as high as about 1.55 V (vs. $Li/Li^+$), the nonaqueous electrolyte battery using the spinel lithium titanate for the negative electrode active material cannot obtain a high battery voltage. In addition, since spinel lithium titanate exhibits a flat charge/discharge curve in the lithium insertion/extraction potential range, a change in potential upon a change in charge state is small.

On the other hand, among oxides of titanium, a lithium-sodium-titanium composite oxide such as $Li_2Na_2Ti_6O_{14}$ can perform lithium insertion and extraction at a low potential, and the operating potential of this composite oxide is about 1.25 V (vs. $Li/Li^+$). However, assignments exist regarding the input/output performance at a low temperature for the nonaqueous electrolyte battery containing $Li_2Na_2Ti_6O_{14}$ for the negative electrode active material.

CITATION LIST

Patent Literatures

Patent Literature 1: Japanese Patent No. 4237659
Patent Literature 2: WO2016/088193A1

SUMMARY

Technical Problem

It is an object of the embodiments to provide a nonaqueous electrolyte battery excellent in input/output performance even at a low temperature and a battery pack including the nonaqueous electrolyte battery.

Solution to Problem

According to one embodiment, provided is a nonaqueous electrolyte battery including a positive electrode, a negative electrode, and a nonaqueous electrolyte. The negative electrode contains a negative electrode active material containing orthorhombic Na-containing niobium-titanium composite oxide particles represented by general formula (1) $Li_{2+v}Na_{2-y}M1_xTi_{6-y-z}Nb_yM2_zO_{14+\delta}$. In general formula (1), M1 is one or two or more elements selected from the group consisting of Cs, K, Sr, Ba, and Ca, M2 is one or two or more elements selected from the group consisting of Zr, Al, Sn, V, Ta, Mo, W, Fe, Co, and Mn, $0 \leq v < 2$, $0 \leq x < 2$, $0 < y < 2$, $0 \leq z < 3$, and $-0.5 \leq \delta \leq 0.5$. The nonaqueous electrolyte contains an Na component in a range of 10 ppm by mass to 3,000 ppm by mass.

In addition, according to one embodiment, provided is a battery pack. The battery pack includes the nonaqueous electrolyte battery according to the embodiment.

BRIEF DESCRIPTION OF THE DRAWINGS

FIG. 5 is an exploded perspective view of a battery pack of an example according to the second embodiment;

DETAILED DESCRIPTION

First Embodiment

Figure 1:
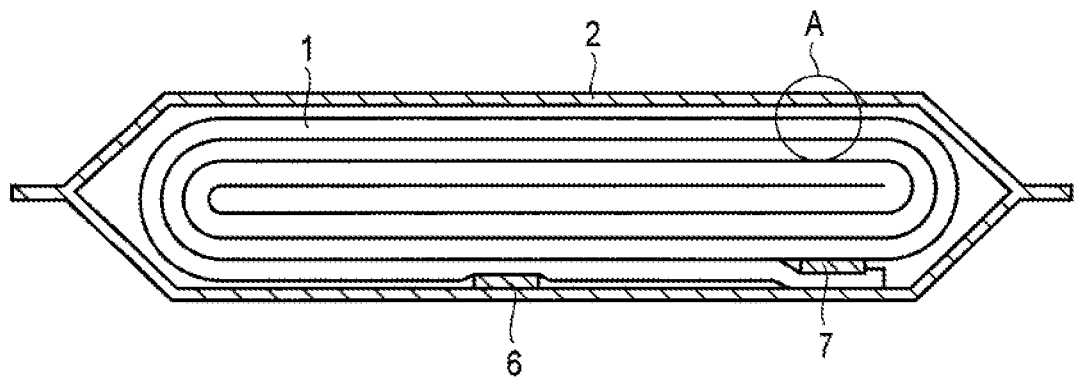
FIG. 1 is a sectional view of a nonaqueous electrolyte battery of a first example according to the first embodiment taken along the thickness direction.

According to the first embodiment, there is provided a nonaqueous electrolyte battery including a negative electrode, a positive electrode, and a nonaqueous electrolyte. The negative electrode contains a negative electrode active material that contains orthorhombic Na-containing niobium-titanium composite oxide particles represented by general formula (1) $Li_{2+v}Na_{2-y}M1_xTi_{6-y-z}Nb_yM2_2O_{4+\delta}$. In the general formula, M1 is one or two or more elements selected from the group consisting of Cs, K, Sr, Ba, and Ca, M2 is one or two or more elements selected from the group consisting of Zr, Al, Sn, V, Ta, Mo, W, Fe, Co, and Mn (a preferable range is represented by one or two or more elements selected from the group consisting of Sn, V, Ta, Mo, W, Fe, Co, and Mn), $0 \leq v < 2$, $0 \leq x < 2$, $0 < y < 2$, $0 \leq z < 3$, and $-0.5 \leq \delta \leq 0.5$.

The nonaqueous electrolyte contains an Na component in a range of 10 ppm by mass to 3,000 ppm by mass.

The reaction potential (also referred to as a lithium insertion/extraction potential) of the orthorhombic Na-containing niobium-titanium composite oxide represented by general formula (1) falls within the range of 1.5 V to 1.0 V (vs. $Li/Li^+$). For this reason, the reaction potential of the negative electrode that contains the negative electrode active material containing this oxide can be lower than the reaction potential of the negative electrode containing spinel lithium titanate as the negative electrode active material. Thus, the operating voltage of the nonaqueous electrolyte battery can be made higher while using the same positive electrode active material, and therefore, the input/output performance of the nonaqueous electrolyte battery can be increased to increase the energy density.

On the other hand, for the orthorhombic Na-containing niobium-titanium composite oxide represented by general formula (1), since sodium is contained in the crystal structure, Na tends to become a factor for inhibiting the oxidation-reduction reaction of lithium ions, which also are monovalent cations, at the surfaces of the negative electrode active material particles. Accordingly, the resistance relevant to the battery reaction increases. Since the increase in resistance becomes drastic at low temperatures, there is decrease in low-temperature input/output performance for the nonaqueous electrolyte battery including the negative electrode containing the orthorhombic Na-containing niobium-titanium composite oxide represented by general formula (1).

The present inventors have found that in the nonaqueous electrolyte battery including the negative electrode containing the negative electrode active material that includes the orthorhombic Na-containing niobium-titanium composite oxide represented by general formula (1), when the nonaqueous electrolyte contains 10 ppm by mass to 3,000 ppm by mass of the Na component, the oxidation-reduction reaction of the lithium ions on the surfaces of the negative electrode active material particles is promoted, and thus, high input/output performance is obtained even at a low temperature. According to the nonaqueous electrolyte battery according to the first embodiment, it is thereby possible to obtain a high energy density and also improve the input/output performance at a low temperature.

Each member of the nonaqueous electrolyte battery according to the embodiment will be described below.

(Negative Electrode)

The negative electrode includes a negative electrode current collector and a negative electrode active material containing layer. The negative electrode active material containing layer contains a negative electrode active material and contains a conductive agent and a binder, as needed. The negative electrode active material containing layer is formed on one surface or both of reverse surfaces of the negative electrode current collector.

The negative electrode active material contains the orthorhombic Na-containing niobium-titanium composite oxide particles represented by general formula (1). General formula (1) will be described below. An atomic ratio v varies within the range of $0 \leq v < 2$ in accordance with the charged state of the orthorhombic Na-containing niobium-titanium composite oxide. The atomic ratio y represents the amounts of Nb and Na. When part of Na is substituted with Nb, the battery energy density increases, therefore y is a value smaller than 2. Since the discharge capacity increases when the oxide contains Na and Nb, y is preferably a value greater than 0. The preferable range of y is $0.1 \leq y \leq 0.8$. The atomic ratio x of the element M1 is $0 \leq x < 2$. The atomic ratio x is limited to the above range because the discharge capacity may become decreased in accordance with an increase in the atomic ratio x, although the change in crystal structure of the active material upon charging/discharging can be suppressed to improve the life performance by addition of the element M1. The atomic ratio z of the element M2 is $0 \leq z < 3$. The atomic ratio z is limited to the above range because this is the range where a target crystal structure can be obtained. The orthorhombic Na-containing niobium-titanium composite oxide having the value of the atomic ratio z falling within this range can exhibit a more excellent rate performance. The atomic ratio $\delta$ falls within the range of $-0.5 \leq \delta \leq 0.5$ for being a value which varies depending on the ratio of lithium and respective metal components, and represents the range where the crystal structure is maintained. The orthorhombic Na-containing niobium-titanium composite oxide having the value of the atomic ratio $\delta$ falling within this range can exhibit an excellent rate performance and an excellent cycle performance.

M2 is at least one selected from the group consisting of Zr, Al, Sn, V, Ta, Mo, W, Fe, Co, and Mn. The orthorhombic Na-containing niobium-titanium composite oxide can realize more excellent cycle performance by containing Zr. The orthorhombic Na-containing niobium-titanium composite oxide can realize more excellent rate performance by containing Sn. V and Ta can exhibit the same physical and chemical properties as Nb. The orthorhombic Na-containing niobium-titanium composite oxide can realize more excellent rate performance by containing Mo. The orthorhombic Na-containing niobium-titanium composite oxide can realize more excellent rate performance by containing W. The orthorhombic Na-containing niobium-titanium composite oxide can realize more excellent cycle performance by containing Fe. The orthorhombic Na-containing niobium-titanium composite oxide can realize more excellent cycle performance by containing Co. The orthorhombic Na-containing niobium-titanium composite oxide can realize more excellent cycle performance by containing Mn. The orthorhombic Na-containing niobium-titanium composite oxide can realize more excellent rate performance by containing Al. M2 preferably includes one or two or more elements selected from the group consisting of Sn, V, Ta, Mo, W, Fe, Co, and Mn. In addition, M2 preferably includes at least one element selected from the group consisting of Al, Zr, Sn, and V.

At least part of a particle surface of the orthorhombic Na-containing niobium-titanium composite oxide particle represented by general formula (1) may be covered with a carbon material layer. Accordingly, the electro-conductivity of the negative electrode active material can be increased. In addition, an Na-containing compound may be attached onto at least part of the particle surface.

The orthorhombic Na-containing niobium-titanium composite oxide particle represented by general formula (1) may be any of a single primary particle, a secondary particle where primary particles are agglomerated, or a mixture of the primary particles and secondary particles. The average particle size preferably falls within the range of 3 μm to 20 μm.

The orthorhombic Na-containing niobium-titanium composite oxide particle represented by general formula (1) can be synthesized by, for example, a solid-phase method.

The negative electrode active material may contain another species of negative electrode active material (to be referred to as a second negative electrode active material) in addition to the orthorhombic Na-containing niobium-titanium composite oxide particle (to be referred to as a first negative electrode active material) represented by general formula (1).

Examples of the second negative electrode active material include a titanium-containing oxide of a spinel crystal structure, a titanium-containing oxide of an anatase crystal structure, a titanium-containing oxide of a rutile crystal structure, a titanium-containing oxide of a bronze crystal structure, a titanium-containing oxide of a ramsdellite crystal structure, a niobium-titanium-containing oxide of a monoclinic crystal structure, a metal composite oxide containing Ti and at least one element selected from the group consisting of P, V, Sn, Cu, Ni, Nb, and Fe, a sulfide, a lithium nitride, an amorphous tin oxide such as $SnB_{0.4}P_{0.6}O_{3.1}$, a tin-silicon oxide such as $SnSiO_3$, and a tungsten oxide such as $WO_3$. One or two or more of second negative electrode active materials may be used.

An example of the spinel titanium-containing oxide is a spinel lithium-titanium composite oxide. Examples of the spinel lithium-titanium composite oxide include $Li_{4+x}Ti_5O_{12}$ (x varies in the range of 0.5≤x≤3 due to charge-and-discharge reaction).

Examples of the ramsdellite titanium-containing oxide include $Li_{2+y}Ti_3O_7$ (y varies in the range of −1≤y≤3 due to charge-and-discharge reaction).

The compositions of the anatase, rutile, and bronze titanium-containing oxides can be expressed as $TiO_2$.

As the metal composite oxide containing Ti and at least one element selected from the group consisting of P, V, Sn, Cu, Ni, Nb, and Fe, examples include $TiO_2$—$P_2O_5$, $TiO_2$—$V_2O_5$, $TiO_2$—$P_2O_5$—$SnO_2$, $TiO_2$—$P_2O_5$—MeO (Me is at least one element selected from the group consisting of Cu, Ni, and Fe). This metal composite oxide preferably has a microstructure of low crystallinity, in which a crystal phase and an amorphous phase coexist or the amorphous phase singly exists. Having such a microstructure can greatly improve the cycle performance.

Examples of the sulfide include a titanium sulfide such as $TiS_2$, a molybdenum sulfide such as $MoS_2$, and an iron sulfide such as FeS, $FeS_2$, or $Li_xFeS_2$ (0≤x≤2).

Examples of the lithium nitride include lithium-cobalt nitride (for example, $Li_xCo_yN$ wherein 0<x<4 and 0<y<0.5).

As the monoclinic niobium-titanium-containing oxide, an example is a compound represented by a general formula $Li_xTi_{1-y}M3_yNb_{2-z}M4_zO_{7+\delta}$, wherein M3 is at least one selected from the group consisting of Zr, Si, Sn, Fe, Co, Mn, and Ni, M4 is at least one element selected from the group consisting of V, Nb, Ta, Mo, W, and Bi, where 0≤x≤5, 0≤y≤1, 0≤z≤2, and −0.3≤δ≤0.3.

The proportion of the first negative electrode active material in the negative electrode active material preferably falls within the range of 70% by mass to 100% by mass. If the proportion of the first negative electrode active material in the negative electrode active material is less than 70% by mass, the low-temperature input/output performance may not be improved even if the amount of the Na component in the nonaqueous electrolyte is specified. A more preferable range is 80% by mass to 100% by mass.

Methods of measuring the crystal structure, composition, and mixing ratio of the negative electrode active material are as follows. First, in order to grasp the crystal state of the active material, a state is set in which lithium ions are desorbed from the active material as the measurement target. Note that the orthorhombic Na-containing niobium-titanium composite oxide contains lithium in its structure, that are not associated with the charge and discharge. For this reason, the "state in which the lithium ions are desorbed" indicates a state in which lithium associated with the charge and discharge is desorbed. For example, if the active material as the measurement target is contained in the negative electrode, the battery is put into a completely discharged state. For example, the nonaqueous electrolyte battery is discharged at 1C until the battery voltage becomes 1.0 V. Note that even in a state in which the battery is discharged, lithium ions remaining in the battery active material may exist. For this reason, precaution is taken in the analysis of an X-ray diffraction pattern. The battery put in the discharged state is disassembled in a glove box filled with argon. An electrode containing the battery active material serving as the measurement target is removed from the disassembled battery. This electrode is washed with an appropriate solvent. For example, ethyl methyl carbonate and the like can be suitably used as the solvent. If washing is insufficient, an impurity phase such as lithium carbonate or lithium fluoride may be mixed-in due to the influence of the lithium ions remaining in the electrode. In this case, a hermetic vessel capable of setting the measurement atmosphere in an inert gas can be used. A negative electrode active material containing layer is dislodged from the negative electrode current collector after drying by using a spatula and the like, and the negative electrode active material containing layer is obtained in powder-form. The crystal structure of the negative electrode active material is identified by powder X-ray analysis measurement. The measurement is performed using CuKα-ray as X-ray source in the measurement range where 2θ is 10° to 90°. By this measurement, the X-ray diffraction pattern of the compound contained in the selected particles can be obtained. SmartLab available from Rigaku is used as an apparatus for powder X-ray diffraction measurement. The measurement conditions are as follows: X-ray source: Cu target; Output: 45 kV 200 mA; Soller slit: 5° for both light incidence and light reception; step width: 0.02 deg; scan speed: 20 deg/min; semiconductor detector: D/teX Ultra 250; sample plate holder: a parallel plate glass sample plate holder (thickness of 0.5 mm); and measurement range: 10°≤2θ≤90°. If another apparatus is used, in order to obtain measurement results equivalent to the above, measurement using the powder X-ray diffraction standard Si powder is performed, and measurement is performed under the condition where the peak intensities and the peak top positions match those of the above apparatus. If the orthorhombic Na-containing niobium-titanium composite oxide is contained in the particles as the measurement target, the X-ray diffraction measurement can confirm that an X-ray diffraction pattern belonging to orthorhombic such as a space group Cmca or Fmmm is obtained.

The X-ray diffraction (XRD) measurement for the electrode can be performed as follows. The electrode as the measurement target is cut to have about the same area as the area of the wide-angle X-ray diffraction apparatus holder, and the cut sample can be directly attached to the glass holder and measured. At this time, the XRD is measured in advance in accordance with the species of electrode current collector, and the position(s) of appearance of the peak(s) derived from the collector is grasped. In addition, the presence/absence of a peak of an agent such as an electro-conductive agent or a binder is also grasped. If the peak(s) of the current collector overlaps the peak(s) of the active material, it is desirable to perform measurement with the active material removed from the current collector. This is in order to separate the overlapping peaks when quantitatively measuring the peak intensities. If the overlapping peaks can be grasped beforehand, the above operations can be omitted. Although the electrode may be physically dislodged, the electrode can be easily dislodged by sonicating with an ultrasonic wave in a solvent. By measuring the electrode thus recovered, the wide-angle X-ray diffraction measurement of the active material can be performed. The mixing state of the active material is judged depending on whether peaks belonging to plural crystal structures appear. Subsequently, the negative electrode active material containing layer is observed with a scanning electron microscope (SEM). Sampling of the sample is also performed in an inert atmosphere of argon or nitrogen, avoiding contact with air. Using a SEM observation image at 3000 times magnification, several particles having the forms of primary or secondary particles examined within the field of view are selected. Whereupon, the particles are selected such that the particle size distribution of the selected particles is spread widely as possible. For the active material, the species of the constituent elements and composition are specified by energy dispersive X-ray spectroscopy (EDX) for the observed active material particles. Accordingly, the species and amounts of the elements other than Li among the elements contained in the selected particles can be specified. Similar operations are performed for each of the plural active material particles, thereby judging the state of mixing of the active material particles. Subsequently, the negative electrode active material containing layer is weighed out. The weighed out powder is dissolved with hydrochloric acid. The solution is then diluted with ion exchange water. The contained metal amount is calculated by inductively coupled plasma atomic emission spectroscopy (ICP-AES). If plural species of active materials are present, their mass ratio is estimated from the content ratio of elements unique to each active material. The ratio of the unique elements and active material mass is judged from the composition of the constituent elements determined by energy dispersive X-ray spectroscopy.

The negative electrode preferably satisfies formula (2) below.

$$0.001 \leq (P2/P1) \leq 0.25 \quad (2)$$

P1 is the C element concentration (atom %) obtained from the intensity of a peak appearing in the range of 289 eV to 294 eV in the spectrum obtained by X-ray photoelectron spectroscopy (XPS) for the negative electrode. P2 is the Na element concentration (atom %) obtained from the intensity of a peak appearing in the range of 1,065 eV to 1,075 eV in the spectrum. Here, the concentration of each element is the concentration of each element when the sum of species of elements obtained by wide scan analysis are taken as 100.

In the above XPS spectrum, the peak appearing in the range of 289 eV to 294 eV belongs to C1s, mainly —C—O—C— or $CO_3^{2-}$. The peak appearing in the range of 1,065 eV to 1,075 eV belongs to Na1s. If the ratio (P2/P1) of the element concentrations (atom %) calculated from the respective peak intensities falls within the above range, it is judged that an organic film is present on the negative electrode surface and Na is further contained in the negative electrode. When such a film is formed, the insertion/extraction of lithium or lithium ions at the active material particle surface is readily promoted. If the ratio (P2/P1) of the element concentrations (atom %) is less than 0.001, it is suggested that the organic film is excessive or Na is not present on the particle surface. In this state, it is probable that the insertion/extraction of the lithium ions is not promoted, whereby the low-temperature rate performance is not improved. If the ratio (P2/P1) of the element concentrations (atom %) is greater than 0.25, it is suggested that no organic film is formed. In this state, the decomposition of the nonaqueous electrolyte may be promoted.

The ratio (P2/P1) of the element concentrations (atom %) can be adjusted to fall within the above range by combining plural conditions such as the species of positive electrode active material and negative electrode active material, the composition of the nonaqueous electrolyte (the content of ethylene carbonate in the nonaqueous electrolyte), the content of the Na component in the nonaqueous electrolyte or the negative electrode, and the like.

The method of measuring the XPS spectrum is as follows. The nonaqueous electrolyte battery is discharged at 1C until the battery voltage becomes 1.0 V. The battery is disassembled in the glove box of an inert atmosphere, and a negative electrode is extracted. The negative electrode is washed with ethyl methyl carbonate and then dried in a vacuum. After the drying, the negative electrode active material containing layer is dislodged from the negative electrode current collector using a spatula and the like, and the negative electrode active material containing layer is obtained in powder-form as a measurement sample. The measurement sample is mounted on the stage of an X-ray photoelectron spectrometry (XPS) apparatus in the inert atmosphere. The measurement sample mounted on the XPS stage is introduced into the XPS measurement apparatus while the inert atmosphere is maintained. The survey scan measurement or wide scan measurement (qualitative analysis) and the narrow scan measurement (state measurement) of the element of interest are performed for the measurement sample introduced into the XPS measurement apparatus. Appropriate fitting is performed for the XPS spectrum obtained by the measurement in this manner.

The electro-conductive agent has an action of improving the current collection performance and suppressing the contact resistance between the active material and the current collector. Examples of the electro-conductive agent include carbonaceous materials such as acetylene black, carbon black, graphite, a carbon nanofiber, and a carbon nanotube. These carbonaceous materials may be used singly or plural carbonaceous materials may be used.

The binder has an action of binding the active material, the electro-conductive agent, and the current collector. Examples of the binder include polytetrafluoroethylene (PTFE), polyvinylidene fluoride (PVdF), fluororubber, styrene butadiene rubber, an acrylic resin or copolymer thereof, polyacrylic acid, and polyacrylonitrile. One or two or more binders may be used. The mixing ratio of the negative electrode active material, the electro-conductive agent, and the binder preferably fall in a range such that the negative active material is 70% by mass to 96% by mass, the negative electrode electro-conductive agent is 2% by mass to 28% by mass, and the binder is 2% by mass to 28% by mass. If the electro-conductive agent is less than 2% by mass, the current collection performance of the negative electrode material containing layer may degrade and the large current performance of the nonaqueous electrolyte battery may degrade. If the binder is less than 2% by mass, the binding property between the negative electrode active material containing layer and the negative electrode current collector may degrade, and the cycle performance may degrade. On the other hand, from the viewpoint of a high capacity, each of the electro-conductive agent and the binder is preferably 28% by mass or less.

A compound containing Na may be contained in the negative electrode active material containing layer. Examples of the Na-containing compound include those described later.

The negative electrode current collector is preferably made of an aluminum foil or aluminum alloy foil. The aluminum alloy preferably contains one or two or more elements selected from the group consisting of Mg, Ti, Zn, Mn, Fe, Cu, and Si.

The negative electrode can be formed by, for example, the following method. A negative electrode active material, an electro-conductive agent, and a binder are suspended in a solvent to prepare a slurry. This slurry is applied to one or both of reverse surfaces of a negative electrode current collector and dried to form a negative electrode active material containing layer. After that, the layer is pressed. Alternatively, the negative electrode active material, the electro-conductive agent, and the binder can be formed into a pellet, and the pellet may be used as the negative electrode active material containing layer.

(Positive Electrode)

The positive electrode includes a positive electrode current collector and a positive electrode active material containing layer. The positive electrode active material containing layer contains a positive electrode active material and further contains an electro-conductive agent and a binder, as needed. The positive electrode active material containing layer is formed on one or both of reverse surfaces of the positive electrode current collector.

The positive electrode active material is not limited to a specific material so long as lithium or lithium ions can be inserted/extracted. Examples of the positive electrode active material may include manganese dioxide ($MnO_2$), an iron oxide, a copper oxide, a nickel oxide, a lithium-nickel composite oxide (for example, $Li_xNiO_2$, $0<x\leq1$), a lithium-cobalt composite oxide (for example, $Li_xCoO_2$, $0<x\leq1$), a lithium-nickel-cobalt composite oxide (for example, $Li_xNi_{1-y}Co_yO_2$, $0<x\leq1$ and $0<y<1$), a lithium-manganese-cobalt composite oxide (for example, $Li_xMn_yCo_{1-y}O_2$, $0<x\leq1$, $0<y<1$), a lithium-nickel-cobalt-manganese composite oxide (for example, $Li_xNi_{1-y-z}Co_yMn_zO_2$, $0<x\leq1$, $0<y<1$, $0<z<1$), a lithium-nickel-cobalt-aluminum composite oxide (for example, $Li_xNi_{1-y-z}Co_yAl_zO_2$, $0<x\leq1$, $0<y<1$, $0<z<1$), a lithium-manganese composite oxide (for example, $Li_xMn_2O_4$, and $Li_xMnO_2$, $0<x\leq1$), a lithium-phosphorus oxide having an olivine structure (for example, $Li_xFePO_4$, $Li_xMnPO_4$, $Li_xMn_{1-y}Fe_yPO_4$, and $Li_xCoPO_4$, $0<x\leq1$ and $0<y<1$), iron sulfate ($Fe_2(SO_4)_3$), and a vanadium oxide (for example, $V_2O_5$). One or two or more positive active materials may be used.

A positive electrode active material containing a lithium-manganese composite oxide having a spinel crystal structure is preferable. A battery module including five nonaqueous electrolyte batteries connected in series, each including a positive electrode containing this positive active material and a negative electrode containing the negative electrode active material that contains orthorhombic Na-containing niobium-titanium composite oxide particles represented by general formula (1), is excellent in voltage compatibility with a lead storage battery. If spinel lithium titanate is used as the negative electrode active material in place of the negative electrode active material containing the orthorhombic Na-containing niobium-titanium composite oxide particles represented by general formula (1), the number of batteries required to obtain a battery module having high voltage compatibility with the lead storage battery would be six. Thus, according to the battery according to the first embodiment, the battery module excellent in voltage compatibility with the lead storage battery can be implemented with a less number of batteries. Therefore, the capacity per unit volume of the battery module and the capacity per unit weight can be improved.

The spinel lithium-manganese composite oxide is preferably represented by $Li_xMn_{2-y}A_yO_4$. Here, A is one or two or more elements selected from the group consisting of Al, Mg, Ti, Cr, Fe, Co, and Zn. Atomic ratios x and y satisfy $0<x\leq1$ and $0\leq y<2$.

As the positive electrode active material, a spinel lithium-manganese composite oxide may be singly used, or plural compounds may be used in combination. Examples of other compounds include $LiMeO_2$ (Me is one or two or more elements selected from the group consisting of Ni, Co, and Mn) and $LiMn_{1-x-y}Fe_xA_yPO_4$ (A is one or two or more elements selected from the group consisting of Mg, Ca, Al, Ti, Zn, and Zr, $0.1\leq x\leq0.35$, and $0.03\leq y\leq0.1$).

The proportion of the spinel lithium-manganese composite oxide in the positive electrode active material preferably falls within the range of 50% by mass to 100% by mass.

Examples of the preferable positive electrode active material other than the spinel lithium-manganese composite oxide include the lithium-cobalt composite oxide, the lithium-nickel-cobalt composite oxide, the lithium-manganese-cobalt composite oxide, the lithium-nickel-cobalt-manganese composite oxide, and the lithium-phosphorus oxide having an olivine structure.

Examples of the electro-conductive agent include carbonaceous materials such as acetylene black, carbon black, graphite, a carbon nanofiber, and a carbon nanotube. These carbonaceous materials may be used singly or plural carbonaceous materials may be used.

The binder has an action of binding the active material, the electro-conductive agent, and the current collector. Examples of the binder include polytetrafluoroethylene (PTFE), polyvinylidene fluoride (PVdF), fluororubber, styrene butadiene rubber, an acrylic resin or copolymer thereof, polyacrylic acid, and polyacrylonitrile. One or two or more binders may be used.

The mixing ratios of the positive electrode active material, the electro-conductive agent, and the binder are preferably in proportions of 80% by mass to 95% by mass, 3% by mass to 18% by mass, and 2% by mass to 17% by mass, respectively. If the content of the electro-conductive agent is 3% by mass or more, the above effects can be obtained. If the content of the electro-conductive agent is 18% by mass or less, the decomposition of the nonaqueous electrolyte on the surface of the electro-conductive agent under high-temperature storage can be reduced. If the content of the binder is 2% by mass or more, a sufficient electrode strength can be obtained. If the content of the binder is 17% by mass or less, the content of the binder which is an insulating material in the positive electrode can be reduced. Accordingly, the internal resistance can be reduced.

The positive electrode current collector is preferably made of an aluminum foil or aluminum alloy foil. The aluminum alloy preferably contains one or two or more elements selected from the group consisting of Mg, Ti, Zn, Mn, Fe, Cu, and Si.

The positive electrode can be formed by, for example, the following method. A positive electrode active material, an electro-conductive agent, and a binder are suspended in a solvent to prepare a slurry. This slurry is applied to one or both of reverse surfaces of an electrode current collector and dried to form a positive electrode active material containing layer. After that, the layer is pressed. Alternatively, the positive electrode active material, the electro-conductive agent, and the binder can be formed into a pellet, and the pellet may be used as the positive electrode active material containing layer.

(Nonaqueous Electrolyte)

The nonaqueous electrolyte contains 10 ppm by mass to 3,000 ppm by mass of an Na component.

If the content of the Na component in the nonaqueous electrolyte is less than 10 ppm by mass, the effect of promoting the oxidation-reduction reaction of lithium ions at the negative electrode active material particle surface cannot be obtained. On the other hand, if the content exceeds 3,000 ppm by mass, the Na component in the nonaqueous electrolyte inhibits the movement of the lithium ions. Accordingly, the output performance of the battery degrades. The more preferable range of the Na content is 30 ppm by mass to 2,000 ppm by mass.

So long as Na is contained, the Na component may be any of one able to be dissolved or dispersed in a nonaqueous electrolyte, one having compatibility with the nonaqueous electrolyte, one insoluble in the nonaqueous electrolyte, or one that precipitates in the nonaqueous electrolyte. The Na component preferably includes one or two selected from the group consisting of an Na ion and a compound containing Na (Na-containing compound). A preferable Na component is one including Na ions. Accordingly, the uniformity of the Na component distribution in the nonaqueous electrolyte is improved, thereby further improving the low-temperature input/output performance.

Examples of the Na-containing compound include $NaPF_6$, $NaBF_4$, $NaClO_4$, $NaAsF_6$, $NaCF_3SO_3$, $NaN(C_2F_5SO_2)_2$, $NaC(CF_3SO_2)_3$, $NaN(CF_3SO_2)_2$, $NaN(SO_2C_2F_5)_2$, $NaN(SO_2F)_2$, $NaPFO_3H$, $NaB(C_2O_4)_2$, $NaF_2BC_2O_4$, and $NaBF_2(OCOOC(CF_3)_2)$. One or two or more Na-containing compounds may be used.

The nonaqueous electrolyte may contain cations such as Na ions ($Na^+$) and Li ions ($Li^+$) and may contain the following as anions. Examples of such anions include $F^-$, $OH^-$, $SO_3^{2-}$, $PO_4^{3-}$, $PF_6^-$, $BF_4^-$, $ClO_4^-$, $AsF_6^-$, $CF_3SO_3^-$, $N(C_2F_5SO_2)_2^-$, $C(CF_3SO_2)_3^-$, $N(CF_3SO_2)_2^-$, $N(SO_2C_2F_5)_2^-$, $N(SO_2F)_2^-$, $PF_2O_2^-$, $PFO_3H^-$, $B(C_2O_4)_2^-$, $F_2BC_2O_4^-$, and $BF_2(OCOOC(CF_3)_2)^-$. One or two or more anions may be used.

The nonaqueous electrolyte may contain an electrolyte. Examples of the electrolyte include lithium salts such as $LiClO_4$, $LiPF_6$, $LiBF_4$, $LiAsF_4$, $LiCF_3SO_3$, and $LiN(CF_3SO_2)_2$. These electrolytes may be singly used, or two or more electrolytes may be used in combination. The electrolyte preferably includes $LiPF_4$.

The concentration of the electrolyte in the nonaqueous electrolyte preferably falls within the range of 0.5 mol/L to 2.5 mol/L.

The nonaqueous electrolyte may contain an organic solvent. The organic solvent is not limited, so long as the electrolyte and the Na-containing compound can be dissolved in the organic solvent. Examples of the organic solvent include a cyclic carbonate such as propylene carbonate (PC), ethylene carbonate (EC), and vinylene carbonate, a linear carbonate such as diethyl carbonate (DEC), dimethyl carbonate (DMC), and methyl ethyl carbonate (MEC); a cyclic ether such as tetrahydrofuran (THF), 2-methyltetrahydrofuran (2-MeTHF), and dioxolane (DOX); a linear ether such as dimethoxyethane (DME) and diethoxyethane (DEE); acetonitrile (AN), and sulfolane (SL). These organic solvents may be used singly or in a combination of two or more solvents.

More preferable examples of the organic solvent include a solvent mixture obtained by mixing two or more selected from the group consisting of propylene carbonate (PC); ethylene carbonate (EC), diethyl carbonate (DEC), dimethyl carbonate (DMC), and methyl ethyl carbonate (MEC). By using such a solvent mixture, a nonaqueous electrolyte battery excellent in the charge and discharge cycle performance can be obtained.

In addition, as the organic solvent, it is preferable that a solvent containing ethylene carbonate is used, and the content of the ethylene carbonate in the nonaqueous electrolyte falls within the range of 10% by mass to 30% by mass. If the content of ethylene carbonate in the nonaqueous electrolyte is less than 10% by mass, the film that promotes insertion/extraction of lithium ions can hardly be formed on the negative electrode active material surface. If the content of ethylene carbonate is greater than 30% by mass, the viscosity of the nonaqueous electrolyte increases. In addition, since the melting point of ethylene carbonate is near room temperature, the low-temperature input/output performance undesirably degrades.

A nonaqueous electrolyte may contain an additive. An additive which does not inhibit the effect of Na in the nonaqueous electrolyte is preferable, and a lithium salt is particularly preferable. As an example of such an additive, the additive may be selected from the group consisting of $LiN(CF_3SO_2)_2$, $LiN(SO_2C_2F_5)_2$, $LiN(SO_2F)_2$, $LiPF_2O_2$, $LiPFO_3H$, $LiB(C_2O_4)_2$, $LiF_2BC_2O_4$, $LiBF_2(OCOOC(CF_3)_2)$ an imide salt including a sulfonyl group within the molecular structure (R1-S($=$O)$_2$—R2), and an imide salt including a phosphoryl group (R3-P($=$R5)($=$O)—R4). One or two or more additives may be used. In the general formula of the imide salt including the sulfonyl group, R1 is an imide group, and R2 is a fluoro group or a hydrocarbon group including the fluoro group. Here, the hydrocarbon group may be cyclic or linear, and may include unsaturated bond(s). In the general formula of the imide salt including the phosphoryl group, R3 is an imide group, and each of R4 and R5 is a fluoro group or a hydrocarbon group including the fluoro group. Here, the hydrocarbon group may be cyclic or linear, and may include unsaturated bond (s).

The form of the nonaqueous electrolyte is not limited; however, the nonaqueous electrolyte may be in the form of, for example, a liquid or gel. A liquid nonaqueous electrolyte contains an organic solvent and an electrolyte dissolved in the organic solvent, in addition to the Na component of 10 ppm by mass to 3,000 ppm by mass. A gel nonaqueous electrolyte is, for example, prepared by obtaining a composite of a liquid nonaqueous electrolyte and a polymer material.

In order to make the Na component of 10 ppm by mass to 3,000 ppm by mass be contained in the nonaqueous electrolyte, for example, (i) an Na-containing compound may be added to the nonaqueous electrolyte, (ii) the Na-containing compound may be added to a positive or negative electrode, and (iii) an Na component may be eluted into the nonaqueous electrolyte from the orthorhombic Na-containing niobium-titanium composite oxide particles represented by general formula (1). The examples of the Na-containing compound have been described previously.

The method (iii) will be described below. The orthorhombic Na-containing niobium-titanium composite oxide particles represented by general formula (1) can mainly have Li ions be inserted and extracted, in the main range from 1.5 V (vs. $Li/Li^+$) to 1.0 V (vs. $Li/Li^+$). If the negative electrode potential is put in a region falling outside the above range, the Na ions may become eluted out from the oxide particles to the nonaqueous electrolyte. An example of a method of eluting Na ions will be described below. After a nonaqueous electrolyte battery is assembled, the battery is set in an over-charged state, or set in an over-discharged state after charging. After that, by subjecting the battery to aging at a high temperature for a desired time, the Na in the negative electrode can be eluted out into the nonaqueous electrolyte. The elution amount of the Na ions can be controlled by, for example, the over-charged state or over-discharged state of the nonaqueous electrolyte battery, an aging temperature, and an aging time. From the viewpoint of the safety of the battery, aging in the over-discharged state is preferable. By limiting the use voltage range of the nonaqueous electrolyte battery to a range different from the voltage at the time of aging, further elution of the Na ions can be prevented.

The Na component amount in the nonaqueous electrolyte can be obtained by the following method. The nonaqueous electrolyte battery is discharged at 1C until the battery voltage becomes 1.0 V, and the battery is disassembled in a glove box of an inert atmosphere. The nonaqueous electrolyte included in the battery and the electrode group is extracted. If the nonaqueous electrolyte is a liquid nonaqueous electrolyte solution, the nonaqueous electrolyte solution is filtered by filter paper corresponding to 5 class C defined in JIS P 3801 [filter paper (chemical analysis)] to remove solid component(s). The filtered solution is then weighed. The resultant electrolyte solution is dissolved in hydrochloric acid, and further diluted with ion exchange water. Thereafter, the amount of contained sodium is calculated by inductively coupled plasma atomic emission spectroscopy.

The nonaqueous electrolyte battery according to the embodiment may further include a separator arranged between the positive electrode and the negative electrode, a container member which houses the positive electrode, the negative electrode, the separator, and the nonaqueous electrolyte, and a positive electrode terminal and a negative electrode terminal which are drawn outside the container member for energization.

(Separator)

As a separator, a synthetic resin unwoven fabric or a porous film formed from a material of, for example, polyethylene, polypropylene, polyethylene terephthalate, cellulose, or polyvinylidene fluoride (PVdF), or the like may be used. In addition, a separator obtained by coating an inorganic compound onto a porous film may be used.

(Container Member)

A sack-shaped container made of laminated film or a metal container is used as the container member.

The form of the container member may be flat-shaped, square-shaped, cylindrically-shaped, coin-shaped, button-shaped, sheet-shaped, stack-shaped, or the like. Note that as a matter of course, the battery may be a large battery mounted in a two-wheel or four-wheel vehicle in addition to a compact battery mounted in a portable electronic device or the like.

A multi-layer film including a metal layer intervening between two resin films is used as the laminated film. The metal layer is preferably an aluminum foil or an aluminum alloy film, so as to achieve lightweight. For example, a polymer material such as polypropylene (PP), polyethylene (PE), nylon, or polyethylene terephthalate (PET) may be used as the resin film. The laminated film can be formed into the shape of the container member by sealing using thermal bonding. The laminated film preferably has a film thickness of 0.2 mm or less.

The metal container may be made of aluminum or an aluminum alloy. The aluminum alloy preferably contains an element such as magnesium, zinc, and silicon. On the other hand, the content of transition metal(s) such as iron, copper, nickel, and chromium is preferably 100 ppm or less. Accordingly, long-term reliability and heat dissipating properties in a high-temperature environment can be greatly improved. The metal container preferably has a wall thickness of 0.5 mm or less, and more preferably 0.2 mm or less.

(Positive Electrode Terminal)

The positive electrode terminal is electrically connected to the positive electrode. In addition, the positive electrode terminal is made of a material which has electrical conductivity and is electrically stable at a potential falling within the range of 3.0 V to 4.5 V with respect to lithium ion metal. The positive electrode terminal is preferably made of aluminum or an aluminum alloy containing one or two or more elements selected from the group consisting of Mg, Ti, Zn, Mn, Fe, Cu, and Si. The positive electrode terminal is preferably formed from the same material as the positive electrode current collector, in order to reduce the contact resistance with the positive electrode current collector.

(Negative Electrode Terminal)

The negative electrode terminal is electrically connected to the negative electrode. In addition, the negative electrode terminal is made of a material which has electrical conductivity and is electrically stable at a potential falling within the range of 1.0 V to 3.0 V with respect to lithium ion metal. The negative electrode terminal is preferably made of aluminum or an aluminum alloy containing one or two or more elements selected from the group consisting of Mg, Ti, Zn, Mn, Fe, Cu, and Si. The negative electrode terminal is preferably formed from the same material as the negative electrode current collector, in order to reduce the contact resistance with the negative electrode current collector.

The nonaqueous electrolyte battery according to the first embodiment will be described in more detail with reference to FIGS. 1 and 2. FIG. 1 is a sectional view of a flat nonaqueous electrolyte battery according to the first embodiment, and FIG. 2 is an enlarged sectional view of a portion A in FIG. 1.

A flat wound electrode group 1 is housed in a sack-shaped container member 2 made of a laminated film including a metal layer intervening between two resin films. The flat wound electrode group 1 is formed such that a stacked body obtained by stacking a negative electrode 3, a separator 4, a positive electrode 5, and the separator 4 in order from the outside is wound in a spiral shape, and the resultant wound body is pressed. As shown in FIG. 2, the outermost negative electrode 3 has an arrangement in which a negative electrode active material containing layer 3b containing the negative electrode active material is formed on one surface on the inner side of a negative electrode current collector 3a. The remainder of the negative electrode 3 is arranged having the negative electrode active material containing layers 3b formed on both the surfaces of the negative electrode current collector 3a. The positive electrode 5 is arranged having positive electrode active material containing layers 5b formed on both the surfaces of a positive electrode current collector 5a.

Near the outer peripheral end of the wound electrode group 1, a negative electrode terminal 6 is connected to the negative electrode current collector 3a of the outermost negative electrode 3, and a positive electrode terminal 7 is connected to the positive electrode current collector 5a of the positive electrode 5 at the inner side. These negative electrode terminal 6 and positive electrode terminal 7 extend outside from an opening of the sack-shaped container member 2. For example, the liquid nonaqueous electrolyte is poured in from the opening of the sack-shaped container member 2. The opening of the sack-shaped container member 2 is heat-sealed having the negative electrode terminal 6 and the positive electrode terminal 7 intervened therebetween, thereby completely sealing in the wound electrode group 1 and the liquid nonaqueous electrolyte.

Figure 2:
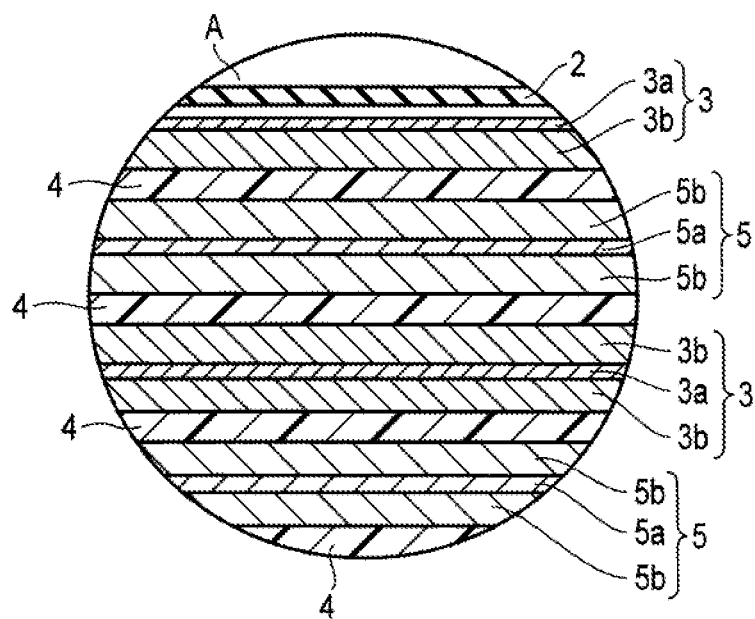
FIG. 2 is an enlarged sectional view of a portion A in FIG. 1.
Figure 3:
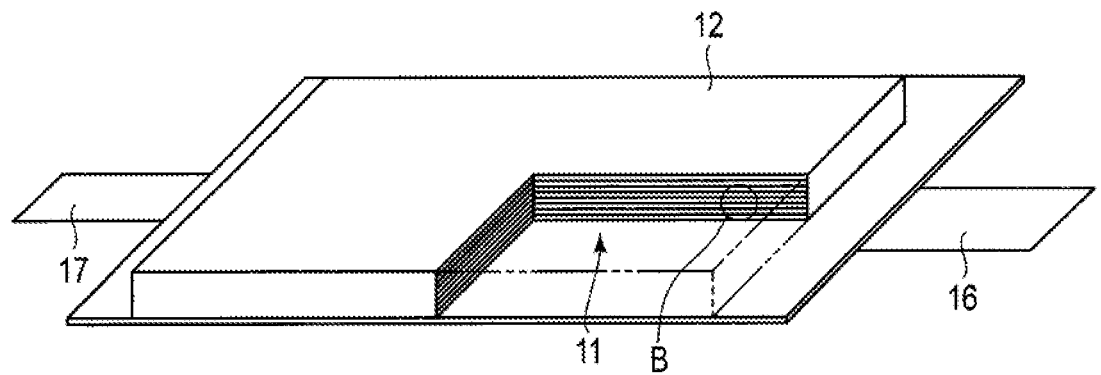
FIG. 3 is a partially cutaway perspective view of a nonaqueous electrolyte battery of a second example according to the first embodiment.
Figure 4:
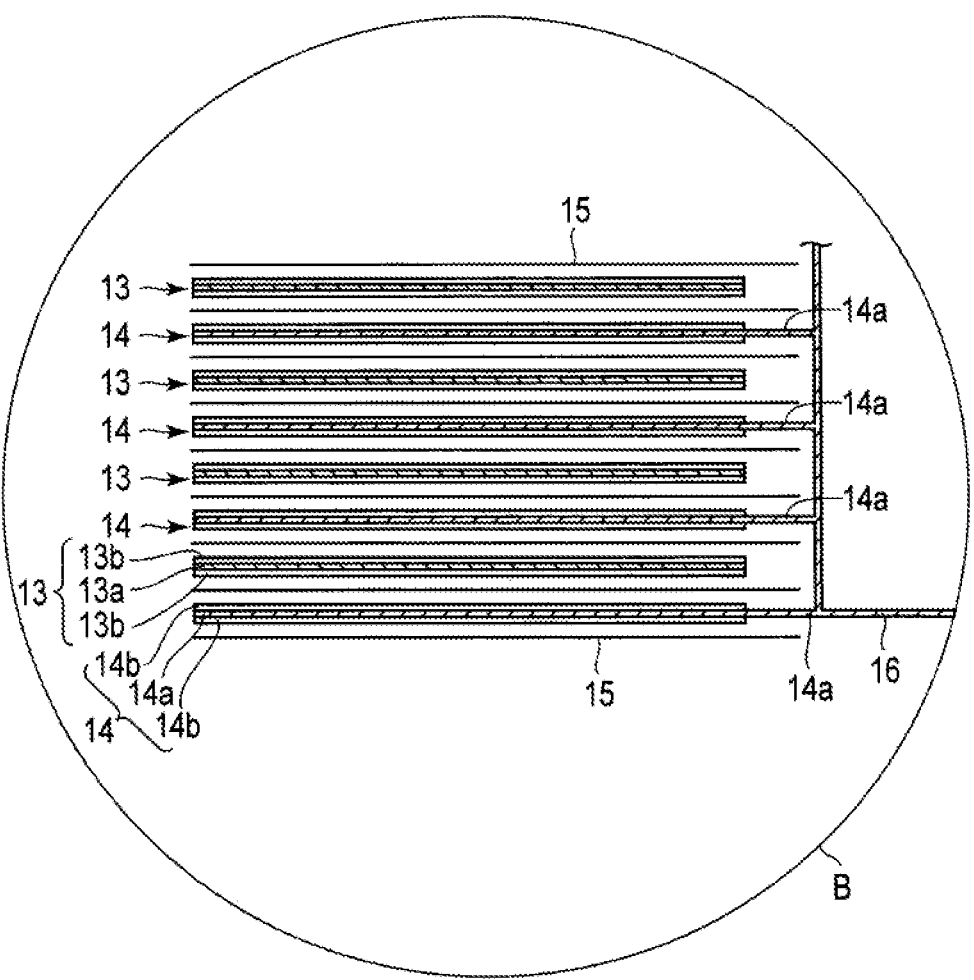
FIG. 4 is an enlarged sectional view of a portion B in FIG. 3.

The nonaqueous electrolyte battery according to the first embodiment is not limited to the arrangement shown in FIGS. 1 and 2, and, for example, an arrangement shown in FIGS. 3 and 4 may be employed. FIG. 3 is a partially cutaway perspective view schematically showing another flat nonaqueous electrolyte battery according to the first embodiment, and FIG. 4 is an enlarged sectional view of a portion B in FIG. 3.

A stacked electrode group 11 is housed in a container member 12 made of a laminated film including a metal layer intervening between two resin films. As shown in FIG. 4, the stacked electrode group 11 has a structure formed by alternately stacking positive electrodes 13 and negative electrodes 14 with separators 15 intervening therebetween. Plural positive electrodes 13 exist, each of which includes a current collector 13a and positive electrode active material-containing layers 13b supported on both the surfaces of the current collector 13a. Plural negative electrodes 14 exist, each of which includes a current collector 14a and negative electrode active material-containing layers 14b supported on both the surfaces of the current collector 14a. The current collector 14a of each negative electrode 14 has one side projecting beyond the positive electrodes 13. Each projecting current collector 14a is electrically connected to a strip-shaped negative electrode terminal 16. The distal end of the strip-shaped negative electrode terminal 16 is drawn out from the container member 12 to the outside. Although not illustrated, in the current collector 13a of each positive electrode 13, a side located on a side opposite to the projecting sides of the current collectors 14a projects beyond the negative electrodes 14. Each current collector 13a projecting beyond the negative electrodes 14 is electrically connected to a strip-shaped positive electrode terminal 17. The distal end of the strip-shaped positive electrode terminal 17 is located on the side opposite to the negative electrode terminal 16 and drawn out from the side of the container member 12 to the outside.

The form of the battery may be flat-shaped, square-shaped, cylindrically-shaped, coin-shaped, button-shaped, sheet-shaped, stack-shaped, or the like. Note that as a matter of course, the battery may be a large battery mounted in a two-wheel or four-wheel vehicle, in addition to a compact battery mounted in a portable electronic device or the like.

The nonaqueous electrolyte battery of the first embodiment includes a negative electrode containing orthorhombic Na-containing niobium-titanium composite oxide particles represented by general formula (1) $Li_{2+v}Na_{2-y}M1_x Ti_{6-y-z}Nb_yM2_zO_{14+\delta}$, and the nonaqueous electrolyte containing a Na component of 10 ppm by mass to 3,000 ppm by mass. Accordingly, there can be implemented a nonaqueous electrolyte battery having a high energy density and being excellent in low-temperature input/output performance.

Second Embodiment

According to the second embodiment, a battery pack is provided. This battery pack includes the nonaqueous electrolyte battery according to the first embodiment.

The battery pack according to the second embodiment may include plural nonaqueous electrolyte batteries. The plural nonaqueous electrolyte batteries may be electrically connected in series or may be electrically connected in parallel. Alternatively, the plural nonaqueous electrolyte batteries may be connected in combination of in-series and in-parallel connections.

For example, the battery pack according to the second embodiment may include five nonaqueous electrolyte batteries according to the first embodiment. These nonaqueous electrolyte batteries may be connected in series. The series-connected nonaqueous electrolyte batteries may form a battery module. That is, the battery pack according to the second embodiment may include a battery module.

The battery pack according to the second embodiment may include plural battery modules. The plural battery modules may be connected in series, in parallel, or in a combination of in-series and in-parallel connections.

The battery pack according to the embodiment will be described in detail with reference to FIGS. 5 and 6. The flat battery shown in FIG. 1 may be used as a single-battery.

Plural single-batteries 21 each formed from a flat nonaqueous electrolyte battery shown in FIG. 1 are stacked such that externally protruding negative electrode terminals 6 and positive electrode terminals 7 are arranged in the same direction, and the single-batteries 21 are fastened by an adhesive tape 22 to form a battery module 23. The single-batteries 21 are electrically connected in series, as shown in FIG. 6.

A printed wiring board 24 is arranged facing the side surfaces of the single-batteries 21 from which the negative electrode terminals 6 and the positive electrode terminals 7 protrude out. As shown in FIG. 6, a thermistor 25, a protective circuit 26, and an energizing terminal (external power distribution terminal) 27 for energization to external device(s) are mounted on the printed wiring board 24. Note that an insulating plate (not shown) is attached to the surface of the protective circuit board 24 facing the battery module 23 to avoid unwanted connection to the wires of the battery module 23.

A positive electrode-side electrode lead 28 is connected to the positive electrode terminal 7 located lowermost in the battery module 23. The distal end of the positive electrode-side electrode lead 28 is inserted into a positive electrode-side electrode connector 29 of the printed wiring board 24 and electrically connected thereto. A negative electrode-side electrode lead 30 is connected to the negative electrode terminal 6 located uppermost in the battery module 23. The distal end of the negative electrode-side electrode lead 30 is inserted into a negative electrode-side electrode connector 31 of the printed wiring board 24 and electrically connected thereto. The connectors 29 and 31 are connected to the protective circuit 26 via wirings 32 and 33 formed on the printed wiring board 24.

The thermistor 25 detects the temperature of the single-batteries 21, and the detection signal is transmitted to the protective circuit 26. The protective circuit 26 can cut-off a plus-side wiring 34a and a minus-side wiring 34b between the protective circuit 26 and the energizing terminal 27 to an external device under a predetermined condition. The predetermined condition is, for example, a state in which the temperature detected by the thermistor 25 is a predetermined temperature or more. Alternatively, the predetermined condition is a state in which over-charge, over-discharge, an overcurrent, or the like of the single-batteries 21 is detected. Detection of the over-charge or the like is done for each single-battery 21 or for all the single-batteries 21. When performing detection for each single-battery 21, the battery voltage may be detected, or the positive electrode potential or negative electrode potential may be detected. In the latter case, a lithium electrode used as a reference electrode is inserted into each single-battery 21. In the case of FIGS. 5 and 6, a wire 35 for voltage detection is connected to each of the single-batteries 21, and a detection signal is transmitted to the protective circuit 26 via the wires 35.

A protective sheet 36 made of rubber or resin is arranged on each of three side surfaces of the battery module 23 except the side surface from which the positive electrode terminals 7 and the negative electrode terminals 6 project.

The battery module 23 is housed in a housing container 37 together with the protective sheets 36 and the printed wiring board 24. That is, the protective sheets 36 are arranged on both inner surfaces of the housing container 37 along the long-side direction and on an inner surface along the short-side direction. The printed wiring board 24 is arranged on the inner surface on the opposite side along the short-side direction. The battery module 23 is located in a space surrounded by the protective sheets 36 and the printed wiring board 24. A lid 38 is attached to the upper surface of the housing container 37.

Note that to fix the battery module 23, a heat-shrinkable tape may be used in place of the adhesive tape 22. In this case, the protective sheets are arranged on both side surfaces of the battery module, and the heat-shrinkable tube is wrapped and shrunk by heat to bind the battery module.

Figure 6:
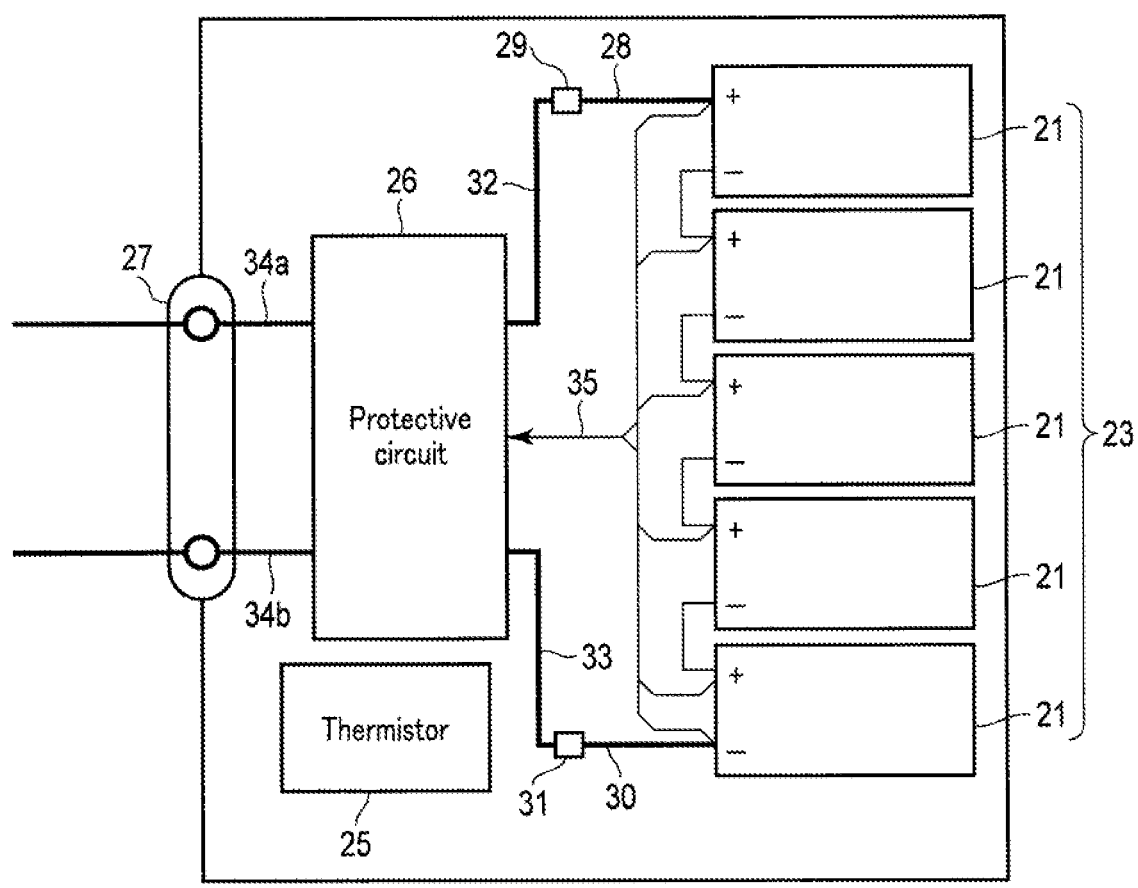
FIG. 6 is a block diagram showing an electrical circuit of the battery pack shown in FIG. 5.

FIGS. 5 and 6 show a form in which the single-batteries 21 are connected in series. However, the single-batteries may be connected in parallel to increase the battery capacity. Assembled battery packs may be connected in series and in parallel, also.

The form of the battery pack can be appropriately changed depending on applications. The battery pack applications which require good cycle performance during a large current performance are preferable. More specifically, examples of the applications include onboard applications for a two-wheel or four-wheel hybrid electric vehicle, a two-wheel or four-wheel electric vehicle, or a power-assisted bicycle, and applications for vehicles such as a train. In particular, onboard applications are preferable.

Figure 7:
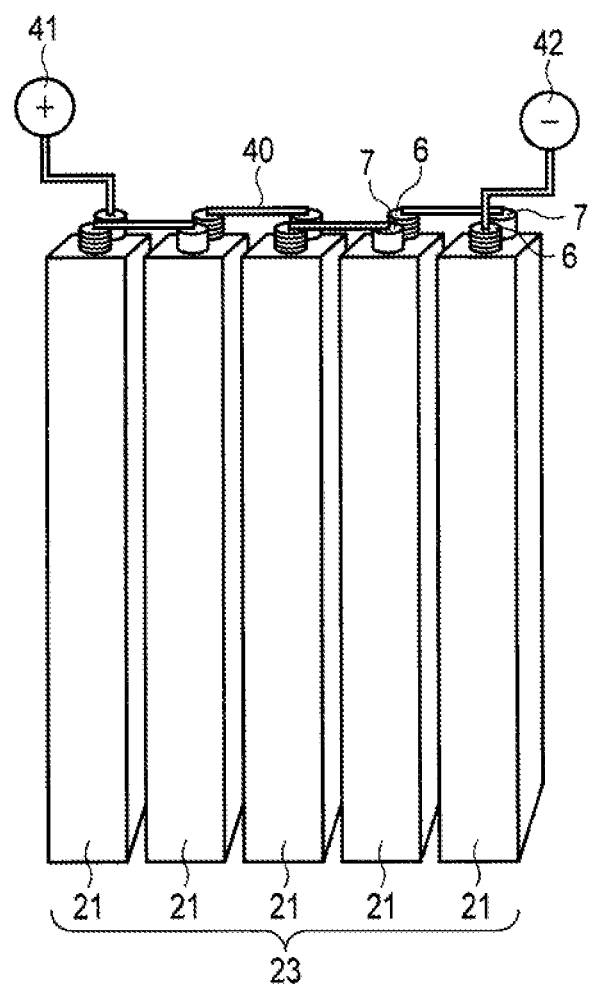
FIG. 7 is a perspective view showing a battery module including the nonaqueous electrolyte battery according to the first embodiment.

FIG. 7 shows a battery module in which plural nonaqueous electrolyte batteries according to the first embodiment are connected in series. The battery module 23 shown in FIG. 7 includes plural (for example, five) of square-shaped nonaqueous electrolyte batteries 21 as unit cells. A metal container is used as the container member of each square-shaped nonaqueous electrolyte battery 21. The positive electrode terminal 7 of each battery 21 (nonaqueous electrolyte battery A) is electrically connected to the negative electrode terminal 6 of the adjacent battery 21 (nonaqueous electrolyte battery B) via a lead 40. In addition, the positive electrode terminal 7 of the battery 21 (nonaqueous electrolyte battery B) is electrically connected to the negative electrode terminal 6 of the adjacent battery 21 (nonaqueous electrolyte battery C) via a lead 40. In this manner, the five batteries 21 are connected in series. The positive electrode terminal 7 of the battery 21 located at one end (left side in FIG. 7) of an array of series-connected batteries 21 is electrically connected to an energizing external positive electrode terminal 41. The negative electrode terminal 6 of the battery 21 located at the other end (right side in FIG. 7) of this array is electrically connected to an energizing external negative electrode terminal 42.

The battery module in which the five nonaqueous electrolyte batteries according to the first embodiment are connected in series can exhibit an average operating voltage of 12 V to 14 V. The average operating voltage within this range is around the same as the average operating voltage of a 12-V battery module including a lead storage battery. Thus, when the battery module capable of exhibiting such an average operating voltage is used being connected in parallel with the 12-V battery module including a lead storage battery, the battery module can assist the input/output of the lead storage battery. Accordingly, over-discharge and charging at an excessive current, which causes the degradation of the lead storage battery, can be prevented. Therefore, the battery module in which the five nonaqueous electrolyte batteries according to the first embodiment are connected in series can exhibit excellent voltage compatibility with the battery module including the lead storage battery. In particular, when the positive electrode active material of the nonaqueous electrolyte battery according to the first embodiment contains the lithium-manganese composite oxide having the spinel crystal structure, the voltage compatibility can be made even higher.

According to the battery pack according to the second embodiment as described above, since the battery pack includes the nonaqueous electrolyte batteries according to the first embodiment, there can be provided the battery pack having a high energy density and being excellent in low-temperature input/output performance.

EXAMPLES

Examples will be described below. The present invention is not limited to the examples described below, as long as the scope of the present invention is not departed.

Example 1

In Example 1, a nonaqueous electrolyte battery according to Example 1 was manufactured by the following procedures.

[Formation of Positive Electrode]

First, a spinel lithium-manganese composite oxide $LiAl_{0.1}Mn_{1.9}O_4$ powder was prepared as a positive electrode active material. This composite oxide, acetylene black serving as an electro-conductive agent, and polyvinylidene fluoride (PVdF) serving as a binder were put in N-methylpyrrolidone (NMP) serving as a solvent at a mixing ratio of 90% by mass: 5% by mass:≤% by mass and were mixed. Subsequently, the resultant mixture was dispersed using a planetary centrifugal mixer, thereby preparing a slurry.

Next, the prepared slurry was applied onto both the surfaces of a current collector made of an aluminum foil having a thickness of 15 tam. The applying amount per unit area was 95 g/m². Next, the applied coat was dried and pressed. Accordingly, a positive electrode having an electrode density (excluding the current collector) of 2.7 g/cm³ was formed.

[Formation of Negative Electrode]

First, an orthorhombic Na-containing niobium-titanium composite oxide $Li_2Na_{1.7}Ti_{5.7}Nb_{0.3}O_{14}$ powder was prepared by the following procedures.

As starting materials, titanium oxide $TiO_2$, lithium carbonate $Li_2CO_3$, sodium carbonate $Na_2CO_3$, and niobium hydroxide (V):Nb(OH)s were prepared. These starting materials were mixed such that the molar ratio of Li:Na:Ti:Nb of the mixture was set to 2:1.7:5.7:0.3. Prior to the mixing, the starting materials were sufficiently pulverized. The mixed materials were annealed at 900° C.; for 3 hours in air. Accordingly, the powder of the Na-containing niobium-titanium composite oxide particles of orthorhombic crystal structure was obtained as a negative electrode active material. The reaction potential (lithium insertion/extraction potential) of the Na-containing niobium-titanium composite oxide particles of orthorhombic crystal structure was 1.5 V (vs. Li/Li⁺) to 1.0 V (vs. Li/Li⁺). In addition, the average particle size of the Na-containing niobium-titanium composite oxide particles of orthorhombic crystal structure was 10 μm.

Next, the powder of the orthorhombic Na-containing niobium-titanium composite oxide particles, acetylene black serving as the electro-conductive agent, and polyvinylidene fluoride (PVdF) serving as the binder were put and mixed in N-methylpyrrolidone (NMP) serving as the solvent at a mixing ratio of 90% by mass: 5% by mass: 5% by mass. Subsequently, the resultant mixture was dispersed using a planetary centrifugal mixer, thereby preparing a slurry.

Next, the prepared slurry was applied onto both the surfaces of a current collector made of an aluminum foil having a thickness of 15 μm. The applying amount per unit area was 100 g/m². Next, the applied coat was dried and pressed. Accordingly, a negative electrode having an electrode density (excluding the current collector) of 2.3 g/cm; was formed.

[Formation of Electrode Group]

Next, two separators each made of a polyethylene porous film having a thickness of 25 μm were prepared.

Next, the positive electrode formed above, one separator, the negative electrode formed above, and the other separator were stacked in the order named to obtain a stacked body. The stacked body was wound in a spiral shape. The resultant structure was heat-pressed at 90° C.; to produce a flat electrode group having a width of 30 mm and a thickness of 3.0 mm.

The resultant electrode group was placed into a pack made of a laminated film, and the resultant structure was dried in a vacuum at 80° C. for 24 hours. The laminated film had an arrangement where a polypropylene layer was formed on each of both the surfaces of an aluminum foil having a thickness of 40 μm. The laminated film had a total thickness of 0.1 mm.

[Preparation of Liquid Nonaqueous Electrolyte] Propylene carbonate (PC), ethylene carbonate (EC), and ethyl methyl carbonate (EMC) were mixed at a volume ratio of 1:1:4, thereby preparing a solvent mixture. $LiPF_6$ serving as the electrolyte was dissolved at 1 M in this solvent mixture. In addition, $NaPF_6$ was mixed and dissolved in this electrolyte mixture so that the Na component content in the nonaqueous electrolyte was 100 ppm by mass, thereby preparing the liquid nonaqueous electrolyte. The EC content in the liquid nonaqueous electrolyte was 17.5% by mass.

[Manufacture of Nonaqueous Electrolyte Secondary Battery]

The liquid nonaqueous electrolyte was poured into the laminate film pack into which the electrode group was placed as described above. After that, the pack was completely sealed by heat-seal. Accordingly, a nonaqueous electrolyte battery having a structure shown in FIGS. 3 and 4 and having a width of 35 mm, a thickness of 3.2 mm, and a height of 65 mm was manufactured. At this time, the capacity of the nonaqueous electrolyte battery was 300 mAh. In addition, the battery voltage obtained when an SOC (State of charge) was 50% was 2.7 V. Note that SOC of 100% is defined as the nominal capacity of the nonaqueous electrolyte battery.

Examples 2-5

Nonaqueous electrolyte batteries were manufactured following the same procedures as in Example 1, except that the Na component contents in the nonaqueous electrolytes were changed as shown in Table 1 below.

Example 6

Propylene carbonate (PC), ethylene carbonate (EC), and ethyl methyl carbonate (FMC) were mixed at a volume ratio of 1:1:4, thereby preparing a solvent mixture. $LiPF_6$ serving as the electrolyte was dissolved at 1 M in this solvent mixture, thereby preparing a liquid nonaqueous electrolyte. The EC content in the liquid nonaqueous electrolyte was 17.5% by mass. A nonaqueous electrolyte battery was assembled following the same procedures as in Example 1 except that the obtained liquid nonaqueous electrolyte was used, and the charge and discharge operations were performed to examine the discharge capacity. After that, the battery was discharged at 1C rate until the battery voltage became 0.5 V. After that, the discharged nonaqueous electrolyte battery was left standing in a 60° C.; environment for 24 hours. After the battery was left standing, the battery was charged again, and then the discharge capacity was examined.

Example 7

Propylene carbonate (PC), ethylene carbonate (EC), and ethyl methyl carbonate (EMC) were mixed at a volume ratio of 1:1:4, thereby preparing a solvent mixture. $LiPF_6$ serving as the electrolyte was dissolved at 1 M in this solvent mixture, thereby preparing a liquid nonaqueous electrolyte. The EC content in the liquid nonaqueous electrolyte was 17.5% by mass. A nonaqueous electrolyte battery was assembled following the same procedures as in Example 1 except that the obtained liquid nonaqueous electrolyte was used, and the charge and discharge operations were performed to examine the discharge capacity. After that, the battery was charged at 1C rate until the battery voltage became 3.2 V. After that, the charged nonaqueous electrolyte battery was left standing in a 60° C. environment for 24 hours. After the battery was left standing, the battery was discharged and charged again, and then the discharge capacity was examined.

Example 8

A nonaqueous electrolyte battery was manufactured following the same procedures as in Example 1 except that the composition of the orthorhombic Na-containing niobium-titanium composite oxide particles was changed as shown in Table 1. The battery voltage obtained when the SOC was 50% was 2.68 V.

Example 9

A nonaqueous electrolyte battery was manufactured following the same procedures as in Example 1 except that a mixture of 90% by mass of the orthorhombic Na-containing niobium-titanium composite oxide particles synthesized following the same procedures as in Example 1 and 10% by mass of lithium titanate of spinel crystal structure ($Li_4Ti_5O_{12}$, the reaction potential (lithium insertion/extraction potential) was 1.55 V (vs. $Li/Li^+$), and the average particle size was 1.5 μm) was used as a negative electrode active material. The battery voltage obtained when the SOC was 50% was 2.65 V.

Example 10

Propylene carbonate (PC) and ethyl methyl carbonate (EMC) were mixed at a mass ratio of 3:5 to prepare a solvent mixture. $LiPF_6$ serving as the nonaqueous electrolyte was dissolved at 1 M in this solvent mixture. In addition, $NaPF_6$ was mixed and dissolved in this electrolyte mixture so that the Na component content in the nonaqueous electrolyte was 100 ppm by mass, thereby preparing a liquid nonaqueous electrolyte. A nonaqueous electrolyte battery was manufactured following the same procedures as in Example 1 except that the resultant liquid nonaqueous electrolyte was used.

Example 11

The powder of the orthorhombic Na-containing niobium-titanium composite oxide particles synthesized following the same procedures as in Example 1, acetylene black serving as the electro-conductive agent, and polyvinylidene fluoride (PVdF) serving as the binder were put and mixed in N-methylpyrrolidone (NMP) serving as the solvent at a mixing ratio of 90% by mass: 5% by mass: 5% by mass. In addition, sodium carbonate ($Na_2CO_3$) as an Na-containing compound was mixed in this mixture so that the Na component content in the nonaqueous electrolyte was 300 ppm by mass. Subsequently, the resultant mixture was dispersed using a planetary centrifugal mixer, thereby preparing a slurry.

The prepared slurry was applied onto both the surfaces of a current collector made of an aluminum foil having a thickness of 15 gum. The applying amount per unit area was 100 g/m². Next, the applied coat was dried and pressed. Accordingly, a negative electrode having an electrode density (excluding the current collector) of 2.3 g/cm² was formed.

A nonaqueous electrolyte battery was manufactured following the same procedures as in Example 1 except that the resultant negative electrode was used.

(Example 12)

Propylene carbonate (PC), ethylene carbonate (EC), and ethyl methyl carbonate (EMC) were mixed at a volume ratio of 1:1:4, thereby preparing a solvent mixture. $LiPF_6$ serving as the electrolyte was dissolved at 1 M in this solvent mixture. In addition, $NaN(CF_3SO_2)_2$ was mixed and dissolved in this electrolyte mixture so that the Na component content in the nonaqueous electrolyte was 100 ppm by mass, thereby preparing the liquid nonaqueous electrolyte. The EC content in the liquid nonaqueous electrolyte was 17.5% by mass.

A nonaqueous electrolyte battery was manufactured following the same procedures as in Example 1 except that the resultant liquid nonaqueous electrolyte was used.

Comparative Example 1

A nonaqueous electrolyte battery was manufactured following the same procedures as in Example 1 except that lithium titanate ($Li_4Ti_5O_{12}$) of the spinel crystal structure was used in place of the orthorhombic Na-containing niobium-titanium composite oxide particles as the negative electrode active material. The battery voltage obtained when the SOC was 50% was 2.4 V.

Comparative Example 2

A nonaqueous electrolyte battery was manufactured following the same procedures as in Example 1 except that $Li_2MgTi_6O_{14}$ of orthorhombic crystal structure (the average particle size was 10 μm) was used in place of the orthorhombic Na-containing niobium-titanium composite oxide particles as the negative electrode active material. The battery voltage obtained when the SOC was 50% was 2.62 V.

Comparative Example 3

A nonaqueous electrolyte battery was manufactured following the same procedures as in Example 1 except that $Li_2SrTi_6O_{14}$ of orthorhombic crystal structure (the average particle size was 10 μm) was used in place of the orthorhombic Na-containing niobium-titanium composite oxide particles as the negative electrode active material. The battery voltage obtained when the SOC was 50% was 2.6 V.

Comparative Example 4

Propylene carbonate (PC), ethylene carbonate (EC), and ethyl methyl carbonate (EMC) were mixed at a volume ratio of 1:1:4, thereby preparing a solvent mixture. A nonaqueous electrolyte battery was manufactured following the same procedures as in Example 1 except that a solution in which $LiPF_6$ serving as the electrolyte was dissolved at 1 M in this solvent mixture was used as the nonaqueous electrolyte.

Comparative Example 5

$NaPF_6$ was mixed and dissolved in the nonaqueous electrolyte prepared in Comparative Example 4 so that the Na component content in the nonaqueous electrolyte was 5,000 ppm by mass, thereby preparing a liquid nonaqueous electrolyte. A nonaqueous electrolyte battery was manufactured following the same procedures as in Example 1 except that the resultant nonaqueous electrolyte was used.

Comparative Example 6

A nonaqueous electrolyte battery was manufactured following the same procedures as in Example 1 except that $Li_2Na_2Ti_6O_{14}$ of orthorhombic crystal structure (the average particle size was 10 μm) was used in place of the orthorhombic Na-containing niobium-titanium composite oxide particles as the negative electrode active material. The battery voltage obtained when the SOC was 50% was 2.7 V.

The contents of the Na components in the nonaqueous electrolytes in the nonaqueous electrolyte batteries of the examples and the comparative examples were examined by the following procedures. Part of each pack serving as a container member was cut, the internal electrolyte solution was extracted, and the pack was completely resealed by heat-seal. The extracted electrolyte solution was analyzed by the above-mentioned method.

For the nonaqueous electrolyte batteries of the examples and the comparative examples, the peak intensity ratios (P2/P1) measured by the above-described method are shown in Table 2.

For each of the nonaqueous electrolyte batteries of the examples and the comparative examples, the capacity upon discharge from a fully-charged state until the battery voltage became 1.5 V at a 1C rate was recorded as the discharge capacity. Each output (Wh) obtained by multiplying the discharge capacity by the average voltage during discharge is shown in Table 2.

For each of the nonaqueous electrolyte batteries of the examples and the comparative examples, after the initial discharge capacity was measured, each nonaqueous electrolyte battery was charged in a 30° C. environment until fully charged. Each battery was left standing for 30 min and discharged at 1C rate until 1.2 V. After that, each nonaqueous electrolyte battery was charged until fully charged. The ambient temperature was adjusted to −20° C., and the battery was left standing for 3 hours after the ambient temperature reached −20° C. After that, each nonaqueous electrolyte battery was discharged at 1C rate. Each value obtained by dividing the discharge capacity at this time by the discharge capacity obtained when the battery was discharged at 30° C. was defined as a low-temperature performance. Results are shown in Table 2

TABLE 1

| | Negative Electrode Active Material Composition | Na Component Content in Nonaqueous Electrolyte (ppm by mass) | Na-containing Compound Added to Nonaqueous Electrolyte or Negative Electrode | Aging |
|---|---|---|---|---|
| Example 1 | $Li_2Na_{1.7}Ti_{5.7}Nb_{0.3}O_{14}$ | 100 | $NaPF_6$ | None |
| Example 2 | $Li_2Na_{1.7}Ti_{5.7}Nb_{0.3}O_{14}$ | 10 | $NaPF_6$ | None |
| Example 3 | $Li_2Na_{1.7}Ti_{5.7}Nb_{0.3}O_{14}$ | 30 | $NaPF_6$ | None |
| Example 4 | $Li_2Na_{1.7}Ti_{5.7}Nb_{0.3}O_{14}$ | 2000 | $NaPF_6$ | None |
| Example 5 | $Li_2Na_{1.7}Ti_{5.7}Nb_{0.3}O_{14}$ | 3000 | $NaPF_6$ | None |
| Example 6 | $Li_2Na_{1.7}Ti_{5.7}Nb_{0.3}O_{14}$ | 10 | None Added | 60° C. for 24 hours in Over-discharged State |
| Example 7 | $Li_2Na_{1.5}Ti_{5.5}Nb_{0.5}O_{14}$ | 3000 | None Added | 60° C. for 24 hours in Over-charged State |
| Example 8 | $Li_2Na_{1.7}Ti_{5.7}Nb_{0.3}O_{14}$ | 100 | $NaPF_6$ | None |
| Example 9 | $Li_2Na_{1.7}Ti_{5.7}Nb_{0.3}O_{14}$/$Li_4Ti_5O_{12}$ = 90/10 mass % | 100 | $NaPF_6$ | None |
| Example 10 | $Li_2Na_{1.7}Ti_{5.7}Nb_{0.3}O_{14}$ | 100 | $NaPF_6$ | None |
| Example 11 | $Li_2Na_{1.7}Ti_{5.7}Nb_{0.3}O_{14}$ | 300 | $Na_2CO_3$ | None |
| Example 12 | $Li_2Na_{1.7}Ti_{5.7}Nb_{0.3}O_{14}$ | 100 | $NaN(CF_3SO_2)_2$ | None |
| Comparative Example 1 | $Li_4Ti_5O_{12}$ | 100 | $NaPF_6$ | None |
| Comparative Example 2 | $Li_2MgTi_6O_{14}$ | 100 | $NaPF_6$ | None |
| Comparative Example 3 | $Li_2SrTi_6O_{14}$ | 100 | $NaPF_6$ | None |
| Comparative Example 4 | $Li_2Na_{1.7}Ti_{5.7}Nb_{0.3}O_{14}$ | 2 | None Added | None |
| Comparative Example 5 | $Li_2Na_{1.7}Ti_{5.7}Nb_{0.3}O_{14}$ | 5000 | $NaPF_6$ | None |
| Comparative Example 6 | $Li_2Na_2Ti_6O_{14}$ | 100 | $NaPF_6$ | None |

TABLE 2

| | Element Concentration Ratio (P2/P1) | Output (Wh) | Low-Temperature Rate Performance |
|---|---|---|---|
| Example 1 | 0.06 | 810 | 0.81 |
| Example 2 | 0.02 | 813 | 0.75 |
| Example 3 | 0.03 | 815 | 0.77 |
| Example 4 | 0.16 | 810 | 0.82 |
| Example 5 | 0.2 | 807 | 0.76 |
| Example 6 | 0.005 | 802 | 0.78 |
| Example 7 | 0.067 | 797 | 0.70 |
| Example 8 | 0.025 | 837 | 0.83 |
| Example 9 | 0.015 | 851 | 0.81 |
| Example 10 | 0.15 | 810 | 0.78 |
| Example 11 | 0.02 | 805 | 0.78 |
| Example 12 | 0.075 | 810 | 0.83 |
| Comparative Example 1 | 0.0002 | 744 | 0.80 |
| Comparative Example 2 | 0.0004 | 608 | 0.70 |
| Comparative Example 3 | 0.0004 | 662 | 0.67 |
| Comparative Example 4 | 0.0006 | 810 | 0.45 |
| Comparative Example 5 | 0.28 | 756 | 0.60 |
| Comparative Example 6 | 0.06 | 660 | 0.78 |

As apparent from Tables 1 and 2, the nonaqueous electrolyte batteries of Examples 1 to 12 accomplished excellent low-rate performance and also exhibited high outputs as compared to Comparative Examples 1 to 6. This is because the nonaqueous electrolyte batteries of Examples 1 to 12 contain orthorhombic Na-containing niobium-titanium composite oxides represented by general formula (1) and thus have high battery voltages, and at the same time, the nonaqueous electrolytes containing the Na components of 10 ppm by mass to 3,000 ppm by mass had been used. More specifically, by comparison of Comparative Examples 1 to 3 and 6 against Example 1, it is found that the battery capacities increased, and the operating voltages of the batteries increased due to decreases in the reaction potentials of the negative electrodes, thereby increasing the energy densities. In addition, by comparison of Comparative Examples 4 and 5 against Examples 1 to 5, it is seen that if the Na components exist in the nonaqueous electrolytes in appropriate amounts, the low-temperature rate performance improves. In the nonaqueous electrolyte battery of Comparative Example 6, although the battery voltage is equivalent to that of the examples, the output becomes lower than that of the examples because the capacity is low.

By comparison among Examples 1 to 5, it is found that when the contents of the Na components are in the range of 30 ppm by mass to 2,000 ppm by mass, the low-temperature rate performance improves further.

From each of the results of Examples 6, 7, and 10, it is found that a good result is obtained also when aging is performed or the Na-containing compound is added to the electrode.

In addition, it is found that a good result is obtained even if the composition of the negative electrode active material or the Na-containing compound is changed, from each of the results of Examples 8, 9, 11, and 12.

As apparent from Table 2, according to each of Examples 1 to 12, as the element concentration ratio (P2/P1) falls within the range of 0.001 to 0.25, the Na component is contained in the negative electrode while the organic film is present on the negative electrode surface. On the other hand, in each of Comparative Examples 1 to 4, the element concentration ratio (P2/P1) is less than 0.001. It is presumed that this is because the reaction potential of the negative electrode active material falls outside the potential range capable of producing the organic film or the Na component amount in the nonaqueous electrolyte had not been appropriate. In addition, in Comparative Example 5, the element concentration ratio (P2/P1) exceeds 0.25. It is presumed that this is because the Na component amount in the nonaqueous electrolyte had not been appropriate.

The nonaqueous electrolyte battery according to each of at least one of the embodiments and the examples described above includes the negative electrode containing the orthorhombic Na-containing niobium-titanium composite oxide particles represented by general formula (1) $Li_{2+v}Na_{2-y}M1_xTi_{6-y-z}Nb_yM2_zO_{14+\delta}$, and the nonaqueous electrolyte containing 10 ppm by mass to 3,000 ppm by mass of the Na component. Therefore, the input/output performance and the low-temperature rate performance are made excellent.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

REFERENCE SIGNS LIST 1, 11 . . . electrode group, 2, 12 . . . container member, 3, 14 . . . negative electrode, 3a, 14a . . . negative electrode current collector, 3b, 14b . . . negative electrode active material containing layer, 4, 15 . . . separator, 5, 13 . . . positive electrode, 5a, 13a . . . positive electrode current collector, 5b, 13b . . . positive electrode active material containing layer, 6, 16 . . . negative electrode terminal, 7, 17 . . . positive electrode terminal, 20 . . . battery pack, 21 . . . single-battery, 22 . . . adhesive tape, 23 . . . battery module, 24 . . . printed wiring board, 25 . . . thermistor, 26 . . . protective circuit, 27 . . . energizing terminal for energizing to external device(s), 37 . . . housing container

What is claimed is:

1. A nonaqueous electrolyte battery comprising:
a positive electrode;
a negative electrode comprising a negative electrode active material, the negative electrode active material comprising orthorhombic Na-containing niobium-titanium composite oxide particles represented by general formula (1) $Li_{2+v}Na_{2-y}M1_xTi_{6-y-z}Nb_yM2_zO_{14+\delta}$, where M1 is at least one element selected from the group consisting of Cs, K, Sr, Ba, and Ca, M2 is at least one element selected from the group consisting of Zr, Al, Sn, V, Ta, Mo, W, Fe, Co, and Mn, $0 \leq v < 2$, $0 \leq x < 2$, $0 < y \leq 0.8$, $0 \leq z < 3$, and $-0.5 \leq \delta \leq 0.5$;
a nonaqueous electrolyte comprising an Na component in a range of 10 ppm by mass to 3,000 ppm by mass; and
an organic film on a surface of the negative electrode,
wherein formula (2) is satisfied:

$$0.001 \leq (P2/P1) \leq 0.25 \quad (2)$$

wherein P1 is a C element concentration (atom %) obtained from an intensity of a peak appearing in a range of 289 eV to 294 eV in a spectrum according to X-ray photoelectron spectrometry for the negative electrode, and P2 is an Na element concentration (atom %) obtained from an intensity of a peak appearing in the range of 1.065 eV to 1.075 eV in the spectrum.

2. The nonaqueous electrolyte battery according to claim 1, wherein the Na component comprises at least one of an Na ion and an Na-containing compound.

3. The nonaqueous electrolyte battery according to claim 2, wherein the nonaqueous electrolyte further comprises a solvent comprising ethylene carbonate, and a content of the ethylene carbonate in the nonaqueous electrolyte falls within a range of 10% by mass to 30% by mass.

4. The nonaqueous electrolyte battery according to claim 1, wherein the positive electrode comprises a positive electrode active material, the positive electrode active material comprising a spinel lithium-manganese composite oxide.

5. A battery pack comprising one or plural of the nonaqueous electrolyte battery according to claim 1.

6. The nonaqueous electrolyte battery according to claim 1, wherein the subscript y satisfies $0 < y \leq 0.5$.

7. The nonaqueous electrolyte battery according to claim 1, wherein the subscript y satisfies $0.1 \leq y \leq 0.8$.

* * * * *